(12) United States Patent
Otomaru et al.

(10) Patent No.: US 11,513,095 B2
(45) Date of Patent: Nov. 29, 2022

(54) SENSOR BOARD AND SENSOR DEVICE

(71) Applicant: KYOCERA Corporation, Kyoto (JP)

(72) Inventors: Hidekazu Otomaru, Kirishima (JP); Takashi Kimura, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 284 days.

(21) Appl. No.: 16/626,963

(22) PCT Filed: Apr. 24, 2018

(86) PCT No.: PCT/JP2018/016610
§ 371 (c)(1),
(2) Date: Dec. 27, 2019

(87) PCT Pub. No.: WO2019/003612
PCT Pub. Date: Jan. 3, 2019

(65) Prior Publication Data
US 2020/0141893 A1 May 7, 2020

(30) Foreign Application Priority Data
Jun. 27, 2017 (JP) ............................. JP2017-125161

(51) Int. Cl.
*G01N 27/407* (2006.01)
*G01N 15/06* (2006.01)
*G01N 27/04* (2006.01)

(52) U.S. Cl.
CPC ..... *G01N 27/4071* (2013.01); *G01N 15/0656* (2013.01); *G01N 27/04* (2013.01)

(58) Field of Classification Search
CPC .......... G01N 27/4071; G01N 15/0656; G01N 27/04; G01N 15/0606
See application file for complete search history.

(56) References Cited

U.S. PATENT DOCUMENTS

| | | | |
|---|---|---|---|
| 10,393,693 B2 | 8/2019 | Chung et al. | |
| 2008/0265870 A1* | 10/2008 | Nair | G01N 15/0656 324/105 |
| 2010/0147052 A1 | 6/2010 | Nelson et al. | |
| 2010/0264900 A1 | 10/2010 | Blackburn et al. | |
| 2017/0122179 A1 | 5/2017 | Miyagawa et al. | |
| 2017/0168002 A1* | 6/2017 | Yang | G01N 27/24 |

(Continued)

FOREIGN PATENT DOCUMENTS

| | | |
|---|---|---|
| EP | 1925926 A1 | 5/2008 |
| GB | 2046921 A | 11/1980 |

(Continued)

*Primary Examiner* — David Z Huang
(74) *Attorney, Agent, or Firm* — Volpe Koenig

(57) ABSTRACT

A sensor board includes an insulating substrate having an upper surface and a lower surface, first detection electrodes located on the upper surface of the insulating substrate, second detection electrodes located on the lower surface of the insulating substrate, and a heat generator located between the first detection electrodes and the second detection electrodes inside the insulating substrate and including at least one conductor layer. A portion of the insulating substrate between the heat generator and the first detection electrodes has the same thickness as a portion of the insulating substrate between the heat generator and the second detection electrodes.

5 Claims, 4 Drawing Sheets

(56) References Cited

U.S. PATENT DOCUMENTS

| | | |
|---|---|---|
| 2017/0241941 A1 | 8/2017 | Chung et al. |
| 2018/0024038 A1* | 1/2018 | Shimokawa ....... G01N 15/0606 73/23.31 |
| 2018/0266936 A1 | 9/2018 | Yamamoto et al. |
| 2019/0003997 A1 | 1/2019 | Noguchi et al. |

FOREIGN PATENT DOCUMENTS

| | | |
|---|---|---|
| JP | 01-299451 A | 12/1989 |
| JP | 2011-501127 A | 1/2011 |
| JP | 2016-020683 A | 2/2016 |
| JP | 2016-217849 A | 12/2016 |
| JP | 2017-058365 A | 3/2017 |
| JP | 2017-111036 A | 6/2017 |
| WO | 2016/060493 A1 | 4/2016 |

\* cited by examiner

SENSOR BOARD AND SENSOR DEVICE

FIELD

The present invention relates to a sensor board including an insulating substrate and electrodes located on the insulating substrate, and a sensor device.

BACKGROUND

Automobiles may incorporate a diesel particulate filter (DPF) to collect particulate matter (PM) mainly containing soot in exhaust gas. To detect, for example, an abnormality of the DPF, a known PM detector that serves as a PM detection sensor may include an insulating substrate formed from sintered ceramics, such as sintered aluminum oxide, and detection electrodes located on a surface of the insulating substrate. The detector detects particulate matter based on a change in the electrical characteristics caused by a detection target, such as PM contained in exhaust gas, adhering between a pair of detection electrodes.

BRIEF SUMMARY

A sensor board according to one aspect of the present invention includes an insulating substrate having an upper surface and a lower surface, a first detection electrode located on the upper surface of the insulating substrate, a second detection electrode located on the lower surface of the insulating substrate, and a heat generator located between the first detection electrode and the second detection electrode inside the insulating substrate and including at least one conductor layer. A portion of the insulating substrate between the heat generator and the first detection electrode has the same thickness as a portion of the insulating substrate between the heat generator and the second detection electrode.

A sensor device according to another aspect of the present invention includes the sensor board with the above structure, and a power source that supplies electric power to the first detection electrode and the second detection electrode.

DETAILED DESCRIPTION

A sensor board and a sensor device according to embodiments of the present invention will now be described with reference to the accompanying drawings. The terms upper and lower (e.g., upper surface) herein are for descriptive purposes, and do not intend to limit the directions in, for example, actual use of the sensor board or the sensor device.

Figure 1A:
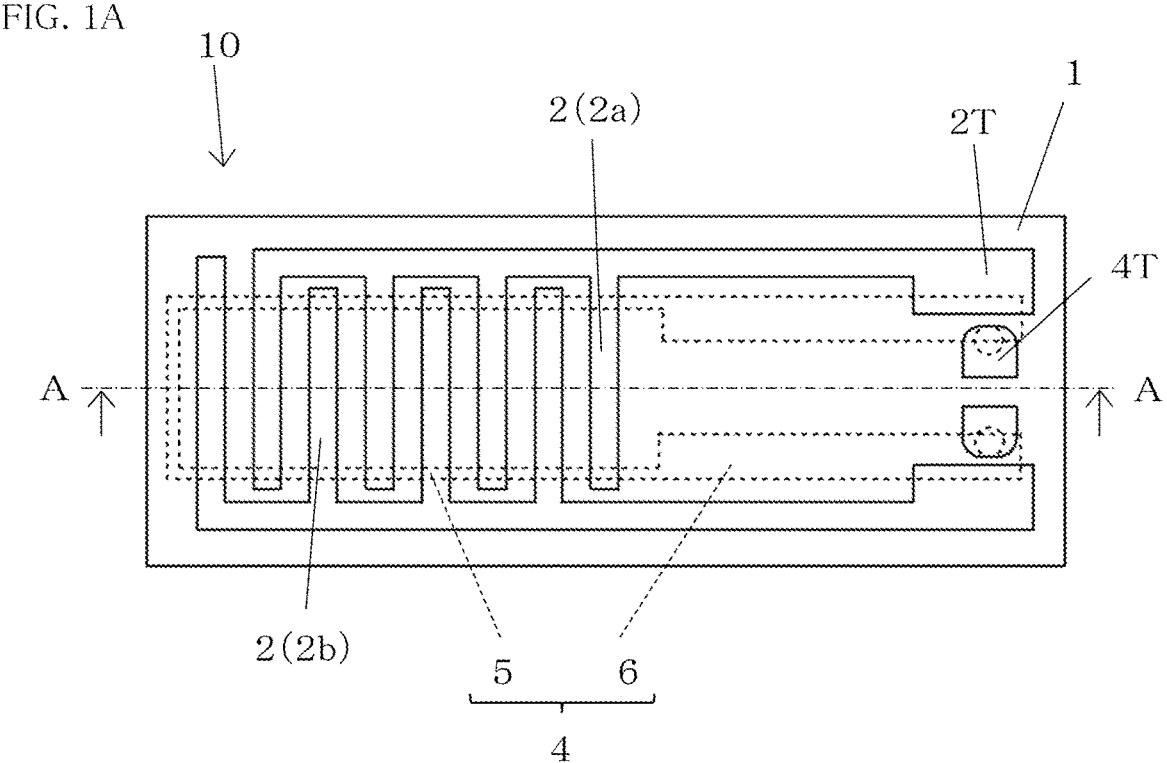
FIG. 1A is a top view of a sensor board according to an embodiment of the present invention.
Figure 1B:
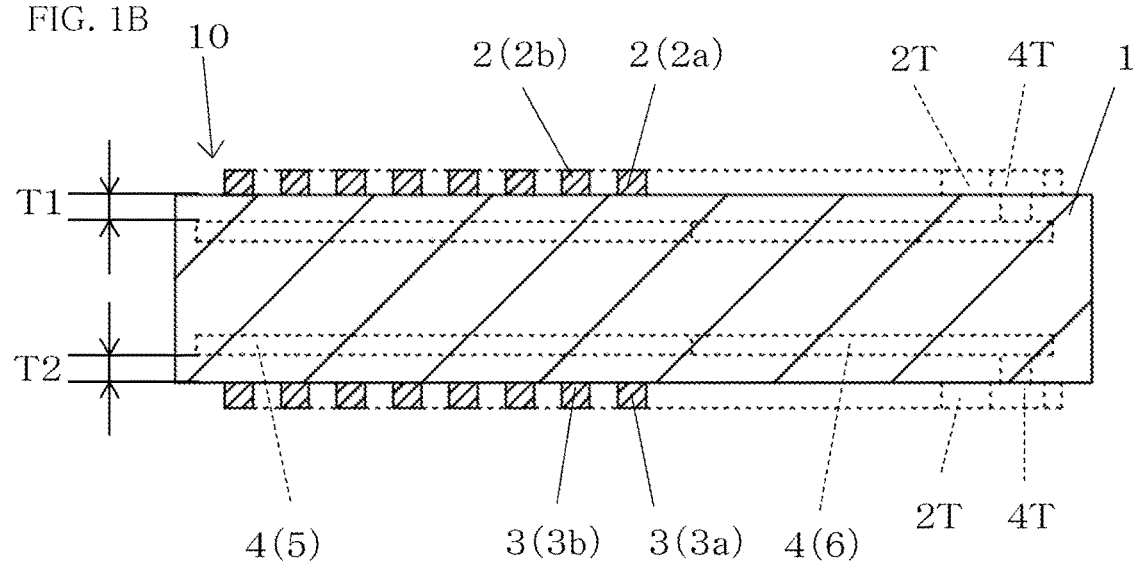
FIG. 1B is a cross-sectional view taken along line A-A in FIG. 1A.

FIG. 1A is a top view of a sensor board according to an embodiment of the present invention, and FIG. 1B is a cross-sectional view taken along line A-A in FIG. 1A.

A sensor board 10 is included in a sensor device for detecting, for example, particulate matter (PM) such as soot that may be contained in exhaust gas from a diesel engine vehicle or a gasoline engine vehicle (e.g., installed on a path for exhaust gas from an automobile). The sensor board 10 basically includes an insulating substrate 1 having an upper surface and a lower surface, a first detection electrode 2 located on the upper surface of the insulating substrate 1, a second detection electrode 3 located on the lower surface of the insulating substrate 1, and a heat generator 4 located inside the insulating substrate 1. The heat generator 4 includes at least one conductor layer 5 that actually generates heat through resistive heating.

The conductor layer 5 is located between the first detection electrode 2 and the second detection electrode 3 inside the insulating substrate 1. The conductor layer 5 may be simply located between the first detection electrode 2 and the second detection electrode 3 inside the insulating substrate 1 without overlapping the first detection electrode 2 or the second detection electrode 3 in a plan view. The first detection electrode 2 include positive electrodes 2a and negative electrodes 2b. The second detection electrode 3 include positive electrodes 3a and negative electrodes 3b. The first detection electrode 2 or the second detection electrode 3 on the upper or lower surface of the insulating substrate 1 include at least one pair of positive and negative electrodes (with no labels when referred to collectively). In the example described below, the first detection electrode 2 and the second detection electrode 3 may be simply referred to as detection electrode or electrode without being distinguished from each other. The positive and negative electrodes 2a and 2b may be simply referred to as the first detection electrode 2, and the positive and negative electrode 3a and 3b may be simply referred to as the second detection electrode 3, without being distinguished from each other.

The first detection electrodes 2 and the second detection electrodes 3 (on the upper surface and the lower surface of the insulating substrate 1) detect particulate matter in an installation environment of the sensor board 10 by detecting the particulate matter, such as soot, adhering to the insulating substrate 1. More specifically, when detecting such particulate matter, the positive electrodes 2a and 3a and the negative electrodes 2b and 3b change, or for example, their electrical insulation decreases or they are short-circuited. Such changes allow detection of particulate matter in the installation environment of the sensor board 10. A short circuit between the positive electrode 2a or 3a and the negative electrode 2b or 3b can be detected by, for example, an external detection circuit connected to the electrodes. The environment contains, for example, the exhaust gas from an automobile described above.

The positive and negative electrodes 2a and 3a as the first detection electrode 2 are located on the upper surface of the insulating substrate 1. The positive and negative electrodes 2b and 3b as the second detection electrode 3 are located on the lower surface of the insulating substrate 1. In the example shown in FIGS. 1A and 1B, the positive electrodes 2a and the negative electrodes 2b as the first detection electrode 2 are interdigitated electrodes that face and interlock each other. The positive electrodes 3a and the negative electrodes 3b as the second detection electrode 3 are also interdigitated electrodes that face and interlock each other. The first detection electrode 2 has the same line width, interval between adjacent electrodes, and pattern as the second detection electrode 3. This allows particulate matter detection in the same manner on the upper surface and the lower surface of the insulating substrate 1.

The first detection electrodes 2 and the second detection electrodes 3 may have different patterns. For example, the positive electrodes (2a or 3a) and the negative electrodes (2b or 3b) on the surface on which higher sensitivity for particulate matter is intended may be arranged at smaller intervals than the electrodes on the other surface, depending on the installation environment of the sensor board 10.

In FIGS. 1A and 1B, an area including either the first detection electrodes 2 or the second detection electrodes 3 is an effective area in which particulate matter is detectable (an area in which particulate matter may adhere). The effective area is to be located in an environment containing, for example, exhaust gas from an automobile, when the sensor board 10 is installed in the environment.

The first detection electrodes 2 and the second detection electrodes 3 are each connected to a positive electrode or a negative electrode of an external direct current (DC) power source (not shown in FIGS. 1A and 1B) through their terminals 2T. The heat generator 4 (described later) is also connected to an external DC power source through its terminals 4T. The terminals 2T of the detection electrodes are conductors continuous with the detection electrodes, and are parts of the detection electrodes. The terminals 4T of the heat generator are conductors continuous with the heat generator 4, and are parts of the heat generator 4.

The terminal 2T of the detection electrodes continuous with the positive electrodes 2a or 3a as the detection electrode 2 or 3 is connected to the positive electrode of the DC power source. The terminal 2T continuous with the negative electrodes 2b or 3b as the detection electrodes 2 or 3 is connected to the negative electrode of the DC power source. In this case, the terminals 4T of the heat generator may be connected to the positive electrode and the negative electrode of the same DC power source as above, or to a positive electrode and a negative electrode of another DC power source. This may be determined in accordance with intended conditions such as control, current values, circuit design, and yield.

The heat generator 4 including at least one conductor layer 5 is located inside the insulating substrate 1. In the example shown in FIGS. 1A and 1B, two conductor layers 5 are located inside the insulating substrate 1. The conductor layers 5 are located between the first detection electrode 2 and the second detection electrode 3. As described above, being located between the first detection electrode 2 and the second detection electrode 3 refers to being located between the first detection electrode 2 and the second detection electrode 3 in a cross-sectional view of FIG. 1B, for example. More specifically, in the example shown in FIGS. 1A and 1B, the conductor layers 5 partially overlap the first detection electrode 2 and the second detection electrode 3 in a plan view. The conductor layers 5 may not overlap the first detection electrode 2 or the second detection electrode 3 in a plan view.

As described above, the heat generator 4 is connected to an external DC power source (e.g., a power source of 20 V). The heat generator 4 is heated to, for example, about 700° C. to decompose and remove particulate matter adhering to the first detection electrode 2, the second detection electrode 3, and near these electrodes. The heat generator 4 generates heat through resistive heating. The heat generator 4 includes the conductor layer 5 that actually generates heat. In the example shown in FIGS. 1A and 1B, connection conductors 6 having a lower electrical resistance extend between the terminals 4T and the conductor layers 5. The conductor layers 5 with a smaller line width than the connection conductors 6 have a greater electrical resistance, and thus generate heat through resistive heating with a current supplied from the terminals 4T. The heat generator 4 may include a heater (conductor layer 5) located inside the insulating substrate 1 and wires (the terminals 4T and the connection conductor 6) for supplying a current to the heater from the upper and lower surfaces of the insulating substrate 1.

The conductor layer 5 included in the heat generator 4 is located at the periphery of the insulating substrate 1 in a plan view. The conductor layer 5 thus efficiently heats the first detection electrode 2 and the second detection electrode 3 in areas including the above periphery, through which heat can easily escape outside. This structure effectively heats, decomposes, and removes particulate matter adhering to the first detection electrode 2, the second detection electrode 3, and near these electrodes. The resultant sensor board 10 minimizes the time taken for regeneration, and allows easy fabrication of a highly practical sensor device.

In the example shown in FIGS. 1A and 1B, the upper and lower conductor layers 5 inside the insulating substrate 1 are located adjacent to the upper and lower surfaces of the insulating substrate 1. The upper conductor layer 5 is located immediately below the first detection electrode 2 inside the insulating substrate 1. The lower conductor layer 5 is located immediately above the second detection electrode 3 inside the insulating substrate 1. The upper conductor layer 5 functions as a heater to mainly heat the first detection electrode 2. The lower conductor layer 5 functions as a heater to mainly heat the second detection electrode 3.

In the sensor board 10 according to the embodiment, a portion of the insulating substrate 1 between the heat generator 4 (conductor layer 5) and the first detection electrode 2 has the same thickness T1 as the thickness T2 of a portion of the insulating substrate 1 between the heat generator 4 (conductor layer 5) and the second detection electrode 3. In a cross-sectional view shown in FIG. 1B, for example, the thickness T1 of the portion of the insulating substrate 1 between the heat generator 4 (conductor layer 5) and the first detection electrode 2 is the distance between the facing surfaces of the first detection electrode 2 and the conductor layer 2. The thickness T2 of the portion of the insulating substrate 1 between the heat generator 4 (conductor layer 5) and the second detection electrode 3 is the distance between the facing surfaces of the second detection electrode 3 and the conductor layer 5. For simplicity, the thickness T1 of the portion of the insulating substrate 1 between the heat generator 4 and the first detection electrode 2 may be referred to as an upper thickness T1, and the thickness T2 of the portion of the insulating substrate 1 between the heat generator 4 and the second detection electrode 3 may be referred to as a lower thickness T2.

The upper thickness T1 and the lower thickness T2 may not be precisely the same but may be slightly different due to, for example, accuracy and variations in preparing the insulating substrate 1 and forming the first detection electrode 2, the second detection electrode 3, and the conductor layers 5 (described later). For example, when the thickness of the insulating substrate 1 is about 0.8 to 1.5 mm and the sensor board 10 is fabricated by stacking ceramic green sheets (described later), the upper thickness T1 and the lower thickness T2 may differ from each other by about 0.1 to 0.3 mm.

The insulating substrate 1, which may be a rectangular prism, serves as a base to receive the first detection electrode 2, the second detection electrode 3, and the heat generator 4 in an electrically insulated manner. The insulating substrate 1 is formed from sintered ceramics, such as sintered aluminum oxide, sintered aluminum nitride, sintered mullite, sintered glass ceramic, or zirconium ceramic (sintered zirconium oxide). The insulating substrate 1 is a stack of multiple insulating layers formed from such sintered ceramics. The sensor board 10 can be fabricated by, for example, stacking ceramic green sheets as described below.

The insulating substrate 1 may be fabricated by, for example, stacking multiple insulating layers formed from sintered aluminum oxide in the manner described below. The insulating substrate 1 fabricated in the manner described below includes upper and lower insulating layers sintered with each other at their interface. Thus, no clear boundary may be viewable between these insulating layers.

A raw material powder such as silicon oxide ($SiO_2$), magnesium oxide (MgO), or manganese oxide ($Mn_2O_3$) is first added to an aluminum oxide ($Al_2O_3$) powder as a sintering aid, and an appropriate binder, solvent, and plasticizer are further added to the mixture. The mixture is then kneaded to prepare ceramic slurry. The ceramic slurry is then shaped into a sheet using a method such as a doctor blade or by calendering to obtain a ceramic green sheet. The ceramic green sheet then undergoes punching as appropriate. Multiple ceramic green sheets prepared in this manner are stacked on one another as appropriate and fired at high temperatures (about 1300 to 1600° C.). The above processes allow the fabrication of the insulating substrate 1.

The insulating substrate 1 may include a crystal phase containing alumina and manganese and a glass phase containing manganese. The crystal phase may also contain various ceramics, such as mullite, zirconia, aluminum nitride, or glass ceramics, other than alumina.

The glass phase is an amorphous phase containing at least $Mn_2O_3$, and may further contain at least one oxide of an element selected from the group consisting of Si, Mg, Ca, Sr, B, Nb, Cr, and Co. The glass phase may be an amorphous phase containing $Mn_2O_3$, $SiO_2$, and MgO.

The glass phase containing manganese is exposed at the surfaces of the insulating substrate, such as the upper and lower surfaces. Thus, the insulating substrate 1 has fewer defects that may cause cracks and is thus less likely to break. When, for example, the insulating substrate 1 comes in contact with exhaust gas, the glass phase having a lower Young's modulus than the crystal phase containing alumina can absorb thermal shock caused by water droplets on the insulating substrate 1, and thus reduces breaks.

The first and second detection electrodes are formed from a metal material that will not oxidize entirely in an environment containing, for example, a high-temperature air current, such as exhaust gas from an automobile. This allows detection of particulate matter for a long period of time. Examples of such metal materials include easily-passivatable metals and platinum. Electrodes made of platinum are highly resistant to oxidation at high temperatures, and are thus unlikely to oxidize entirely. Electrodes made of an easily-passivatable metal have their exposed surfaces covered with passivation layers, and are thus unlikely to oxidize entirely.

Examples of easily-passivatable metals include base metal materials that contain at least one element selected from the group consisting of iron, aluminum, nickel, titanium, chromium, and silicon. The metal material for the detection electrodes contains, for example, at least one of such base metal materials by at least about 80% by mass. The base metal materials do not catalyze decomposition of particulate matter. The use of such materials lowers the likelihood that the adhering particulate matter is decomposed unintentionally and increase the detection accuracy.

The metal material for the detection electrodes 2 mainly containing at least one of the above base metal materials may further contain at least one of other metal components. Such other metal materials may be metal materials that may not easily form passivation layers, and may be other metal materials (e.g. tungsten).

The first detection electrode 2 and the second detection electrode 3 may be formed in the manner described below. A powder of at least one of the above base metal materials is kneaded with an organic solvent and a binder to prepare a metal paste. The metal paste is then applied in a predetermined pattern to a main surface and other areas of a ceramic green sheet to be the insulating substrate 1. The metal paste is applied by, for example, screen printing. The metal paste and the ceramic green sheet are then co-fired. The above processes allow the fabrication of the insulating substrate 1 including the first detection electrode 2 and the second detection electrode.

More specifically, metal materials for forming a passivation layer containing an oxide on the surfaces include a Fe—Ni—Cr—Ti—Al alloy and a $MoSi_2$ metal. The thickness of the passivation layer is set to, for example, about 0.1 to 5 μm. The passivation layer with a thickness in the range effectively covers the surfaces of the detection electrodes 3a to 3h, and thus effectively reduces the likelihood that the electrodes oxidize entirely or mostly.

The first detection electrode 2 and the second detection electrode 3 may have about 90% of their surface areas covered by passivation layers. In other words, 90% or more of the exposed surfaces of the first detection electrode 2 and the second detection electrode 3 may be covered with passivation layers. This structure effectively reduces the likelihood that the detection electrodes oxidize entirely.

The surfaces of the first detection electrode 2 and the second detection electrode 3 may be entirely covered with passivation layers. In other words, the exposed surfaces of the detection electrodes may be entirely covered with passivation layers. This structure more effectively reduces the likelihood that the detection electrodes oxidize entirely.

The terminals 2T of the first detection electrode 2 and the second detection electrodes 3 may also be formed from the same metal material in the same manner as described above. The terminals 2T of the first detection electrode 2 and the second detection electrode 3 may also be covered with a plating layer in the same manner as described above.

The surfaces of the terminals 2T of the first detection electrode 2 and the second detection electrode 3 may be each covered with a metal plating layer by electroplating or electroless plating. The metal plating layer is formed from a metal highly resistant to corrosion and easily connectable with a connection member, such as nickel, copper, gold, or silver. For example, the metal plating layer includes a nickel plating layer with a thickness of about 0.5 to 10 μm and a gold plating layer with a thickness of about 0.1 to 3 μm that are sequentially deposited, or a nickel plating layer with a thickness of about 1 to 10 μm and a silver plating layer with a thickness of about 0.1 to 1 μm that are sequentially deposited. These plating layers effectively reduce corrosion at the terminals 2T of the detection electrodes. A metal plating layer formed from a metal other than the above metals, such as a palladium plating layer, may be additionally deposited between the above plating layers.

The conductor layer 5, the connection conductor 6, and the terminals 4T included in the heat generator 4 are formed from, for example, the same metal material and the same manner as the first and second detection electrodes 2 and 3. Examples of the metal materials for forming the heat generator 4 (the conductor layer 5 in particular) include materials including iron, titanium, chromium, and silicon with high electrical resistivity, to particularly increase heat generation efficiency. The heat generator 4 may mainly contain a metal resistant to oxidation, such as platinum or a Fe—Ni—Cr alloy.

The above metal material constitutes at least about 80% by mass of the conductor layer 5 in the heat generator, and is a main component of the heat generator 4. The heat generators 4 may also contain an inorganic component, such as glass or a ceramic material, other than the metal material. The inorganic component adjusts the firing shrinkage that occurs when, for example, the heat generator 4 are co-fired with the insulating substrate 1.

The connection conductor 6 and the terminals 4T included in the heat generator 4 are electrically connected with each other with a feedthrough conductor (with no labels) extending partially through the insulating substrate 1 in the thickness direction. The feedthrough conductor can be a part of the connection conductor 6, and can be formed from the same metal material and the same manner as the connection conductor 6 (described later).

The first detection electrode 2, the second detection electrode 3, the conductor layer 5, and the connection conductor 6 (including the feedthrough conductor) are formed by preparing a metal paste containing the powder of the above metal material kneaded with an organic solvent and a binder, and applying or embedding, in a predetermined pattern, the metal paste to the surface or into through-holes of the ceramic green sheet to be the insulating substrate 1. The through-holes are preliminarily formed by, for example, punching. The metal paste is applied or embedded by, for example, screen printing. The ceramic green sheet to which the metal paste to be the first detection electrode 2, the second detection electrode 3, the conductor layer 5, and the connection conductor 6 (including the feedthrough conductor) are printed is stacked on other ceramic green sheets as appropriate. The metal paste and the ceramic green sheets are then co-fired. The above processes allow the fabrication of the sensor board 10 including the first detection electrode 2, the second detection electrode 3, the conductor layer 5, and the connection conductor 6.

During fabrication, the upper thickness T1 equal to the lower thickness T2 can be achieved by using the same number of insulating layers with the same layer thickness between the heat generator 4 and the first detection electrode 2 and between the heat generator 4 and the second detection electrode 3. In this case, the insulating layers can have varying thicknesses depending on the accuracy in preparing the ceramic green sheets. As described above, the difference in the upper thickness T1 and the lower thickness T2 caused by such variations falls within tolerance.

The insulating layers between the heat generator 4 and the first detection electrode 2 in the portion with the upper thickness T1 may each have a thickness different from the insulating layers between the heat generator 4 and the second detection electrode 3 in the portion with the thickness T2. In this case, the value obtained by multiplying the thickness of each layer and the number of layers for the upper thickness T1 is set the same as the value obtained by multiplying the thickness of each layer and the number of layers for the lower thickness T2.

Figure 2:
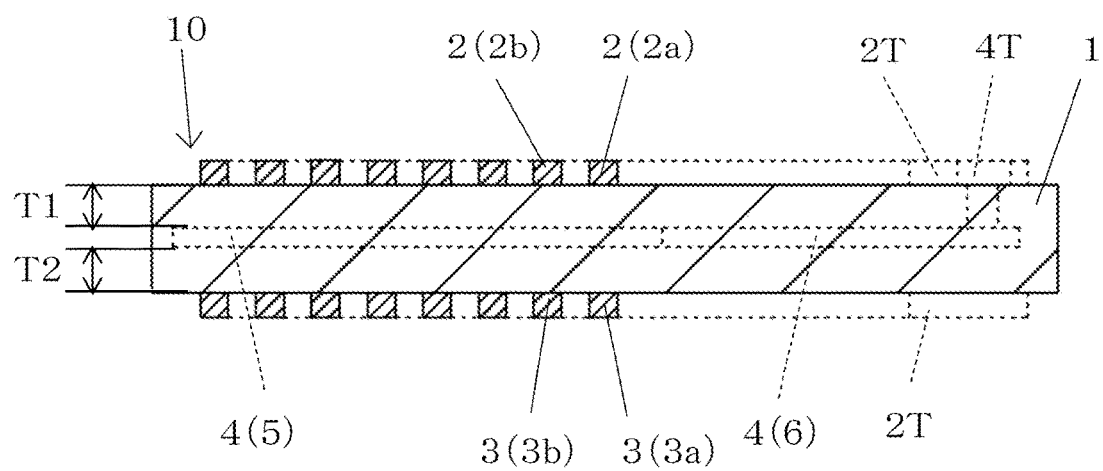
FIG. 2 is a cross-sectional view of a sensor board according to another embodiment of the present invention.

FIG. 2 is a cross-sectional view of a sensor board according to another embodiment of the present invention. In FIG. 2, the same components as in FIGS. 1A and 1B are given the same reference numerals. In the example shown in FIG. 2, a single conductor layer 5 is located inside an insulating substrate 1. A sensor board 10 according to this embodiment includes a heat generator 4 including the single conductor layer 5, a connection conductor 6, and terminals 4T. The structure in this example differs from the structure shown in FIGS. 1A and 1B in the heat generator 4, and includes the same other components. The same components as described above will not be described.

In the example shown in FIG. 2, the heat generator 4 including the conductor layer 5 is also located between the first detection electrode 2 and the second detection electrode 3 inside the insulating substrate 1. A portion of the insulating substrate 1 between the heat generator 4 and the first detection electrode 2 has the same thickness (upper thickness) T1 as the thickness (lower thickness) T2 of a portion of the insulating substrate between the heat generator 4 and the second electrode 3.

In the example shown in FIG. 2, the single conductor layer 5 supplies heat equally to the upper and lower surfaces of the insulating substrate 1 to heat both the first detection electrodes 2 and the second detection electrodes 3. This heats and removes particulate matter adhering to the first detection electrodes 2, the second detection electrodes 3, and near these electrodes. In this example, the single conductor layer 5 can heat both the first detection electrodes 2 and the second detection electrodes 3. This structure can reduce the thickness of the sensor board 10. This structure also increases heating efficiency and thus reduces power consumption.

In the example shown in FIG. 2 as well, the upper thickness T1 and the lower thickness T2 are equal to each other. This structure allows effective heating on both the upper and lower surfaces of the insulating substrate 1. The structure thus effectively removes particulate matter adhering to the first detection electrode 2, the second detection electrode 3, and near these electrodes.

As in the embodiment referring to FIGS. 1A and 1B, the heat generator 4 including the conductor layer 5 immediately below the upper surface of the insulating substrate adjacent to the first detection electrode 2 and the conductor layer 5 immediately above the lower surface of the insulating substrate 1 adjacent to the second detection electrode 3 have the advantageous effects described below.

The conductor layers 5 can be each located adjacent to the first detection electrode 2 and the second detection electrode 3. This structure can effectively heat the adhering particulate matter. The structure also allows adjustment of electric power (current value) supplied to the conductor layer 5 adjacent to the first detection electrode 2 and the conductor layer 5 adjacent to the second detection electrode 3. When, for example, different amounts of particulate matter adhere to the first and second detection electrodes 2 and 3 with different degrees of removability, the heating conditions (current amount) may be easily adjusted separately for the first detection electrode 2 and for the second detection electrode 3. The structure allows effective use of electric power by the conductor layers 5 in generating heat through resistive heating, thus reducing, for example, the load on automobile batteries for supplying power and improving the performance and usefulness of the automobile including fuel efficiency and durability.

Figure 3A:
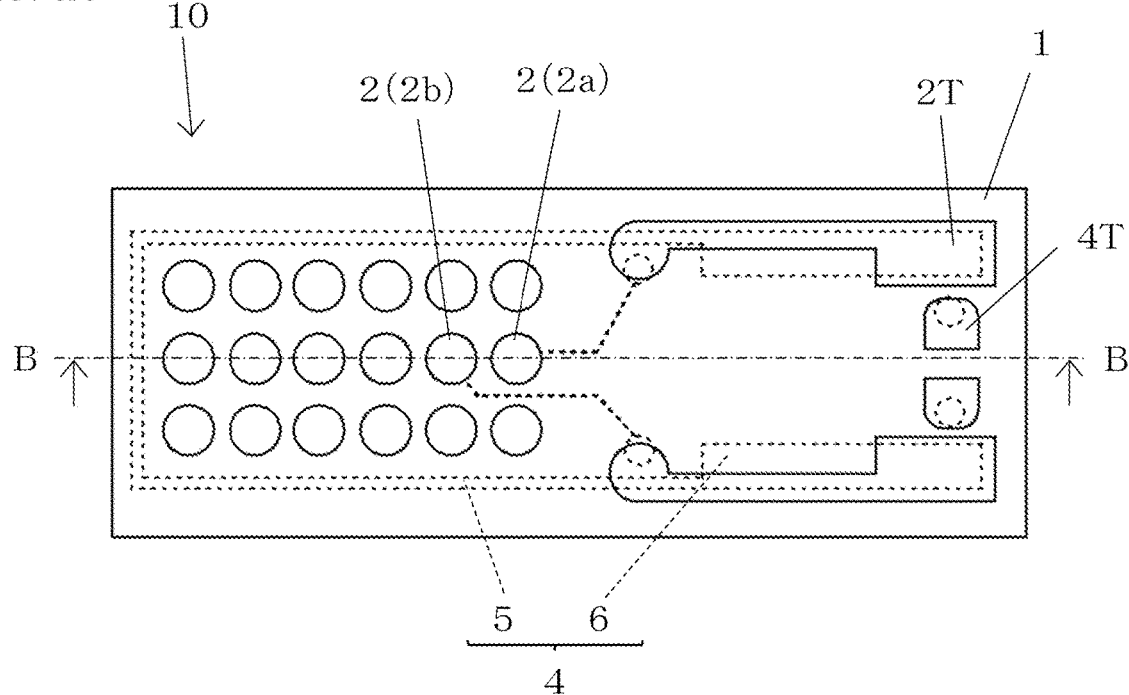
FIG. 3A is a top view of a sensor board according to another embodiment of the present invention.
Figure 3B:
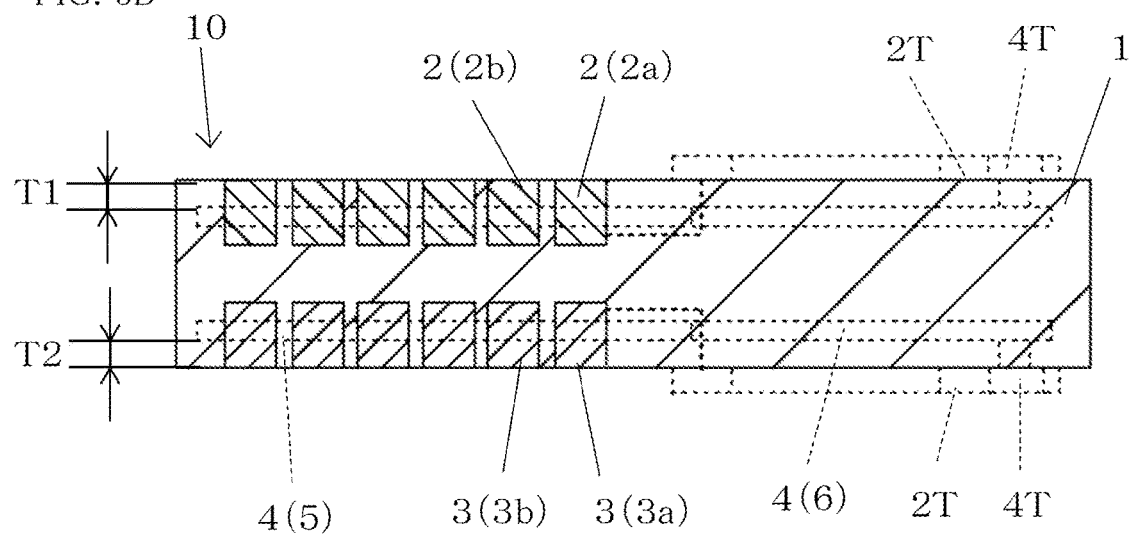
FIG. 3B is a cross-sectional view taken along line B-B in FIG. 3A.

FIG. 3A is a top view of a sensor board according to another embodiment of the present invention, and FIG. 3B is a cross-sectional view taken along line B-B in FIG. 3A. In FIG. 3, the same components as in FIGS. 1A and 1B are given the same reference numerals. In the example shown in FIGS. 3A and 3B, conductor layers 5 included in heat generators 4 are located at the periphery of the insulating substrate 1 in a plan view. In the example shown in FIGS. 3A and 3B, each electrode is columnar, and has its exposed end face functioning as an electrode. In a sensor board 10 according to this embodiment, each heat generator 4 includes the conductor layer 5, a connection conductor 6, and terminals 4T. The structure in this example differs from the structure shown in FIGS. 1A and 1B in the arrangement of the heat generator 4 and the shape of the electrodes, and includes the same other components. The same components as described above will not be described.

The conductor layers 5 included in the heat generators 4 are located at the periphery of the insulating substrate 1 in a plan view, allowing heat to effectively transfer from the periphery of the insulating substrate 1, through which heat can easily escape outside, toward the middle portion of the insulating substrate 1 in a plan view, thus heating the adhering particulate matter. The middle portion of the insulating substrate 1 contains no conductor layer 5 in a plan view. This structure reduces excessive heating of the middle portion with heat generated by the conductor layers 5. This reduces wasteful consumption of power supplied to the conductor layers 5, and allows efficient heating of the adhering particulate matter with less power.

In the example shown in FIGS. 3A and 3B, the conductor layers 5 avoid overlapping the first detection electrode 2 or the second detection electrode 3 in a plan view. As in this example, the conductor layers 5 may be located without overlapping the first detection electrode 2 or the second detection electrode 3. This structure also allows heat from the conductor layers 5 to transfer effectively from the periphery of the insulating substrate 1 toward the middle portion in a plan view. This effectively heats and removes particulate matter adhering to the first detection electrode 2, the second detection electrode 3, and near these electrodes.

In the example shown in FIGS. 3A and 3B as well, the upper thickness T1 and the lower thickness T2 are equal to each other. This structure allows effective heating on both the upper and lower surfaces of the insulating substrate 1. The structure thus effectively removes particulate matter adhering to the first detection electrode 2, the second detection electrode 3, and near these electrodes.

In the example shown in FIGS. 3A and 3B, the first detection electrode 2 and the second detection electrode 3 are columnar. The columnar electrodes are feedthrough conductors (with no labels for feedthrough conductors) that partially extend through the insulating substrate 1 in the thickness direction. The end faces of the feedthrough conductors exposed at the upper and lower surfaces of the insulating substrate 1 practically function as detectors for detecting adhering particulate matter. The columnar electrodes include adjacent positive and negative electrodes 2a and 2b and adjacent positive and negative electrodes 3a and 3b. As in the interdigitated electrodes, the positive electrodes 2a or 3a are connected to a positive electrode of a DC power source. The negative electrodes 2b or 3b are connected to a negative electrode of the DC power source.

In FIGS. 3A and 3B, the wiring conductors electrically connecting one pair of positive and negative electrodes 2a and 2b or 3a and 3b with the terminals 2T of the detection electrodes are shown, and other wiring conductors are not shown for simplifying the drawings. The wiring conductors each include, for example, a feedthrough conductor extending from a terminal 2T into the insulating substrate 1 and an inner wire located between insulating layers. The feedthrough conductors and the inner wires may be located dispersedly between multiple layers depending on the space allowed for the wiring conductors.

When the electrodes are columnar as in this example, the positive and negative electrode pairs 2a and 2b or 3a and 3b can be arranged more densely on the insulating substrate 1 than when these electrodes are interdigitated electrodes. Thus, particulate matter can be detected effectively. Each pair of positive and negative electrodes 2a and 2b or 3a and 3b may be electrically connected to a different detection circuit. This structure can identify a pair of positive electrode 2a or 3a and negative electrode 2b or 3b between which particulate matter has adhered. This structure can also detect, for example, a part containing a large amount of particulate matter in the installation environment of the sensor board 10 (e.g., a position in an exhaust pipe for exhaust gas).

Figure 4:
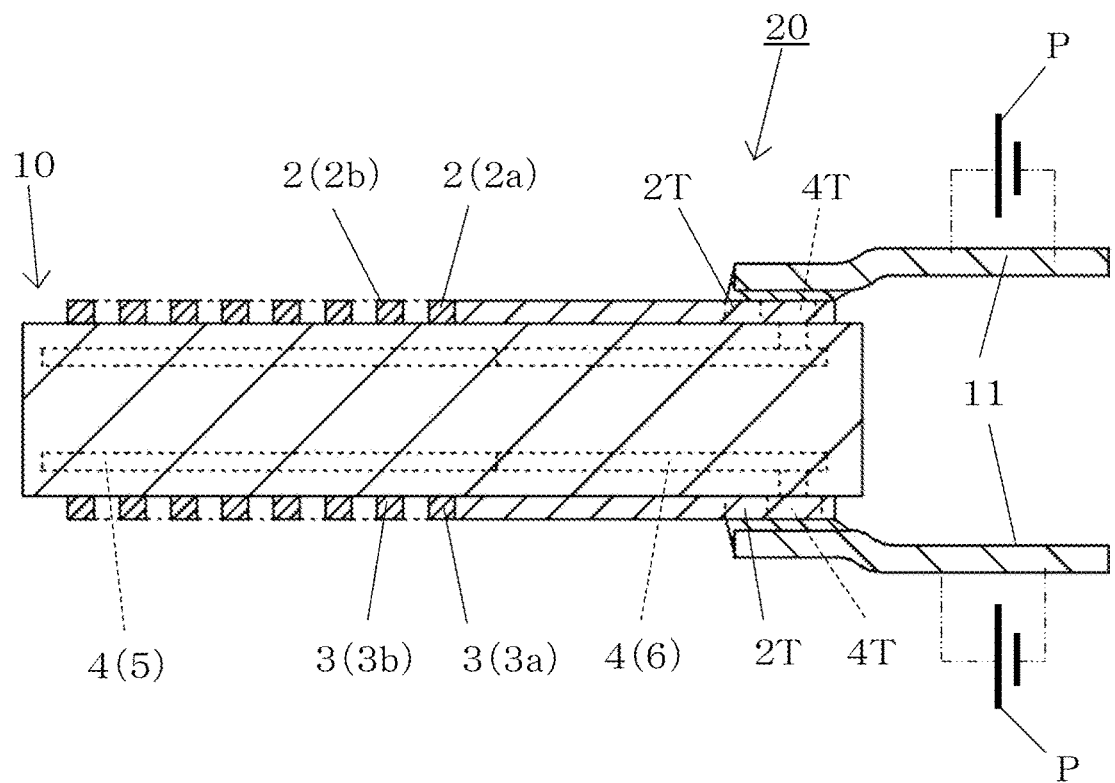
FIG. 4 is a cross-sectional view of a sensor device according to another embodiment of the present invention.

FIG. 4 is a cross-sectional view of a sensor device 20 according to another embodiment of the present invention. The sensor device 20 includes a sensor board 10 having any one of the structures described above and power sources P supplying electric power to the first detection electrode 2 and the second detection electrode 3. The power sources P are, for example, DC power sources as described above. The DC power sources may be storage batteries installed in a device such as an automobile or a facility that discharges a gas containing particulate matter.

In the sensor device 20 according to this embodiment, the terminals 2T connected to the first detection electrode 2 and the second detection electrode 3 are connected to lead terminals 11, through which the first and second detection electrodes 2 and 3 are electrically connected to the power sources P.

The lead terminals 11 are not directly used to detect particulate matter. Thus, the lead terminals 11 may be formed from any material appropriately selected in accordance with the installation environment, the yield and the economy of the sensor board 10, or other conditions. When, for example, the lead terminals 11 are formed from a metal material highly resistant to oxidation such as platinum or gold, the sensor device 20 including the lead terminals 11 can be highly reliable. The lead terminals 11 may also be formed from, for example, an iron based alloy, such as an iron-nickel-cobalt alloy, or copper for economy. The lead terminals 11 formed from an iron based alloy or copper may have the exposed surfaces protected with plating layers, such as gold plating layers.

The lead terminals 11 are joined to the terminals 2T or other components with, for example, a brazing material (with no labels) such as a silver brazing material (silver-copper brazing material) or a gold brazing material. Similarly to the lead terminals 11, the brazing material may be any material appropriately selected in accordance with various conditions for either manufacturing or using the sensor board 10.

Similarly to the terminals 2T of the detection electrodes, the terminals 4T included in the heat generators 4 may be electrically connected to power sources with conductive connectors, such as lead terminals (not shown). The power sources electrically connected with the terminals 4T of the heat generators 4 may be the same as or different from the power sources P electrically connected with the terminals 2T of the detection electrodes. The power sources may be appropriately selected in accordance with, for example, the power amount to be used by the heat generators 4.

The sensor board and the sensor device according to the embodiments of the present invention are not limited to the structures described above, and may be changed variously within the scope of the present invention. For example, the interval between a pair of adjacent positive and negative electrodes 2a and 2b or 3a and 3b as the first or second detection electrode 2 or 3 may differ from the interval between another pair of adjacent positive and negative electrodes 2a and 2b or 3a and 3b. The intervals in one portion may be different from the intervals in the other portion. In this case, the portion with the smaller intervals can detect adhering particulate matter in a low concentration (a low volume percentage in the exhaust gas) with high sensitivity. At the same time, the portion including the larger intervals can detect adhering particulate matter (having a low volume percentage in the exhaust gas) over a longer period of time. More specifically, the sensor board and the sensor device can effectively improve sensitivity and extend the service life.

REFERENCE SIGNS LIST 1 insulating substrate
2 first detection electrode
2a positive electrode
2b negative electrode
3 second detection electrode
3a positive electrode
3b negative electrode
4 heat generator
5 conductor layer
6 connection conductor
10 sensor board
11 lead terminal
20 sensor device

The invention claimed is:

1. A sensor board having a long axis and a short axis, comprising:
    an insulating substrate having an upper surface and a lower surface;
    a first detection electrode located on the upper surface of the insulating substrate;
    a second detection electrode located on the lower surface of the insulating substrate; and
    a heat generator located between the first detection electrode and the second detection electrode inside the insulating substrate, the heat generator including at least one conductor layer,
    wherein a portion of the insulating substrate between the heat generator and the first detection electrode has the same thickness as a portion of the insulating substrate between the heat generator and the second detection electrode,
    the heat generator further includes a connection conductor connected to the at least one conductor layer,
    the at least one conductor layer includes a first conductor portion that overlaps the first detection electrodes along the long axis in a plan view, and a second conductor portion that does not overlap the first detection electrodes along the long axis in a plan view, and the first conductor portion is located between the connection conductor and the second conductor portion in a plan view.

2. The sensor board according to claim 1, wherein the heat generator includes the at least one conductor layer comprising a first conductor layer and a second conductor layer located adjacent to the first detection electrode and below the upper surface of the insulating substrate, and the second conductor layer located adjacent to the second detection electrode and above the lower surface of the insulating substrate.

3. A sensor device, comprising:
    the sensor board according to claim 1; and
    a power source configured to supply electric power to the first detection electrode and the second detection electrode.

4. The sensor board according to claim 1, wherein the connection conductor is located inside the insulating substrate, and a line width of the connection conductor is larger than that of the conductor layer.

5. The sensor board according to claim 4, wherein in a plan view, the connection conductor is apart from an outer edge of the insulating substrate.

* * * * *